United States Patent [19]

Rupert

[11] 4,039,779

[45] Aug. 2, 1977

[54] APPARATUS FOR COMPENSATING FOR ELECTRODE WEAR IN AN ELECTRICAL DISCHARGE MACHINE

[75] Inventor: Gary F. Rupert, Ann Arbor, Mich.

[73] Assignee: Raycon Corporation, Ann Arbor, Mich.

[21] Appl. No.: 639,851

[22] Filed: Dec. 11, 1975

[51] Int. Cl.² .............................................. B23P 1/04
[52] U.S. Cl. ............................ 219/69 G; 235/151.11; 318/640
[58] Field of Search ............... 219/69 G, 69 M, 69 V, 219/69 C; 235/151.11; 318/640, 687, 283, 567, 569, 571

[56] References Cited

U.S. PATENT DOCUMENTS

| 3,125,700 | 3/1964 | Bentley et al. | 219/69 G |
| 3,372,321 | 3/1968 | Inaba et al. | 235/151.11 |
| 3,394,293 | 7/1968 | Taniguchi et al. | 318/640 |
| 3,510,620 | 5/1970 | Smith | 219/69 G |
| 3,601,572 | 8/1972 | Check et al. | 219/69 M |
| 3,662,143 | 5/1972 | Davis | 219/69 G |
| 3,688,074 | 8/1972 | Stirner | 219/69 G |
| 3,731,044 | 5/1973 | Ullmann et al. | 219/69 W |
| 3,777,104 | 12/1973 | Bell | 219/69 G |
| 3,815,125 | 6/1974 | May et al. | 235/151.11 |
| 3,875,374 | 4/1975 | Inoue | 219/69 G |

Primary Examiner—Bruce A. Reynolds
Attorney, Agent, or Firm—Olsen and Stephenson

[57] ABSTRACT

Electrical discharge machining apparatus having means to sense the position of the electrode at the start of EDM machining of a workpiece. The apparatus includes means to measure the forward movement of the electrode during each machining cycle and regulate the backward retracting movement of the electrode to a preselected distance so as to compensate for erosion of the electrode during the machining cycle to thereby facilitate positioning of the electrode in the correct location for the next machining cycle. The apparatus includes a sensing device operable to transmit electrical pulses corresponding to incremental movements of the electrode and control circuitry which receives the pulses and controls subsequent movement of the electrode.

3 Claims, 2 Drawing Figures

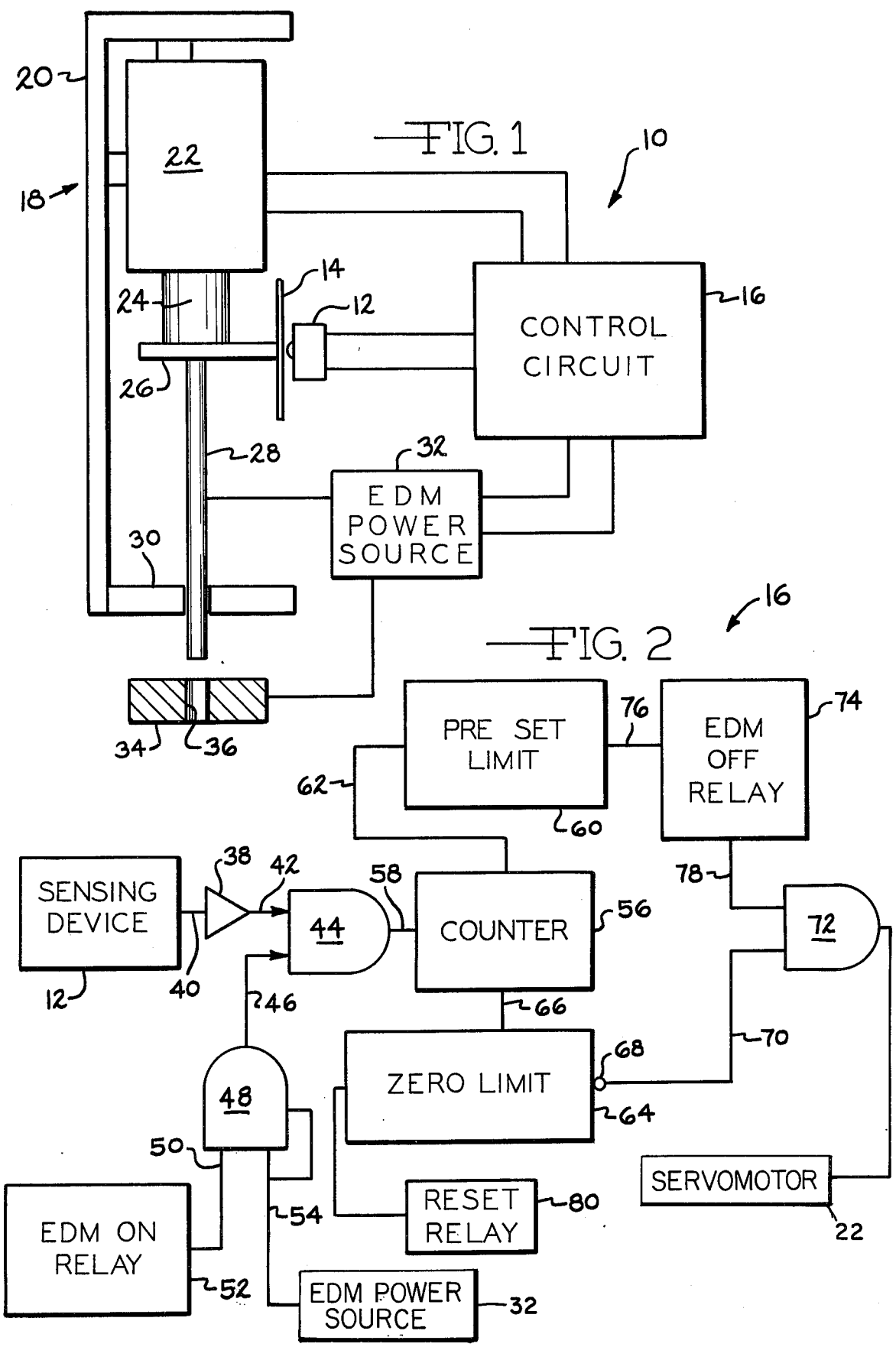

APPARATUS FOR COMPENSATING FOR ELECTRODE WEAR IN AN ELECTRICAL DISCHARGE MACHINE

BACKGROUND OF THE INVENTION

The present invention relates generally to electrical discharge machining apparatus and more particularly to electronic apparatus which senses the position of the electrode at the start of EDM machining and controls the reciprocal movement of the electrode and the machining of the workpiece.

It is well known in electrical discharge machining (EDM) that an electrode erodes as it machines a workpiece so that prior to successive machining passes the electrode must be replenished to compensate for such wear. Also, in order to adapt electrical discharge machining devices to high production output it is necessary to quickly and accurately position the electrode relative to the workpiece prior to each machining pass so that the proper gap is formed between the electrode and the workpiece during the machining operation.

It is an object, therefore, of the present invention to provide electrical discharge machining apparatus with electronic refeed which senses and controls the movement of the electrode during electrical discharge machining.

SUMMARY OF THE INVENTION

The present invention provides electronic refeed apparatus which senses the position of the electrode at the start of EDM machining, measures the forward movement of an electrode through a workpiece and controls the retraction of the electrode a known fixed distance after it has machined a workpiece.

In the illustrated embodiment of the present invention, a measuring device adapted to duplicate the movement of the electrode and an associated stationary sensing device which detects relative movement between itself and the measuring device are incorporated in conventional EDM apparatus. Control circuitry is connected between a servomotor which reciprocally moves the electrode and an EDM power supply so that movement of the electrode and machining of the workpiece are controlled.

The control circuitry includes counters which measure the movement of the electrode by counting the pulses emitted by the sensing device and after a predetermined number of pulses have been counted, the control circuitry terminates machining, starts retraction of the electrode, and then terminates retraction of the electrode after the servomotor moves it back a predetermined fixed distance. To insure accurate, measured movement of the electrode relative to a workpiece positioned in a noncritical position, logic circuitry is included in the control circuitry to allow the signals sent by the sensing device to be counted only after machining of the workpiece has begun so that the reference point for all electrode movement is the initial point where machining begins.

The electronic refeed mechanism of this invention thus senses the position of the electrode at the start of EDM machining to thereby facilitate future positioning of the electrode.

Further objects, features and advantages of the present invention wll become apparent from a consideration of the following description when taken in connection with the appended claims and the following drawing in which:

FIG. 1 diagrammatically shows EDM apparatus along with the electronic refeed of the present invention; and FIG. 2 is a diagram of the control circuitry of the present invention.

With reference to the drawing, the electronic refeed of the present invention, indicated generally at 10 in FIG. 1, comprises a sensing device 12, a measuring device 14 and control circuitry represented by the block diagram 16, all incorporated in conventional electrical discharge machining (EDM) apparatus 18 which includes a main support 20 on which an EDM servomotor 22 is secured. An electrode holder 24 is connected to the servomotor 22 and a platen 26, to which the measuring device 14 is connected, is secured to the electrode holder 24. An electrode 28 is secured in the holder 24 and an electrode guide 30 which stablizes the electrode 28 during movement is affixed to the support 20.

A conventional EDM power source, indicated at 32, is connected to the electrode 28, a workpiece 34 to be machined and to the control circuitry 16. In the illustrated embodimemt of the invention, the workpiece 34, which is held in a fixed position in any conventional manner, is shown having been machined with the electrode 28 to form a hole 36 therethrough.

The measuring device 14 and the sensing device 12 constitute a well known system that is used in the present invention for determining the linear movement of the electrode 28. In the illustrated embodiment, the measuring device 14 is secured to the platen 26 for vertical movement therewith and has a main scale grating consisting of a series of parallel horizontal slots formed thereon. The sensing device 12 is stationarily mounted and operates to detect the movement of the measuring device 14 as the grating scale moves coincidentally with the electrode 28 past the sensing device 12. Pulses of electrical energy, each representing increments of electrode movement, are generated by the sensing device 12 as the measuring device 14 is moved and are transmitted to the control circuitry 16. Detection of such linear movement can be accomplished by the well known "Moire Fringe Transducer" or any other suitable linear coding device.

The control circuit 16 (FIG. 2) comprises an amplifier 38 connected by line 40 to the sensing device 12. The output line 42 of the amplifier 38 forms one input to a logic And gate 44. The other input line 46 to the And gate 44 forms the output line of a sealed And gate 48 which has one input line 50 connected to the relay 52 and has the other input line 54 connected to the EDM power source 32. After an input pulse has been transmitted along line 54 to the sealed And gate 48, the transmission signals through line 50 determine the output of the sealed And gate 48. That is, after the sealed And gate 48 has been activated to generate a logic 1 or high state in line 46 it will continue to do so even though the input signal is removed from line 54 and will shut off only when the input signal is removed from line 50.

A counter 56 is connected to the And gate 44 by conductor 58 and connected to the counter 56 are a pair of electronic limit devices which are conventional comparator circuits and which together with the counter 56 form a well-known digital counter/controller. A counter limit 60 is connected by line 62 to the counter 56 and a counter limit 64 is connected to the counter 56 by the line 66. An inverter 68 inverts the output of the counter limit 64 and is connected by the line 70 which forms the input to an And gate 72. The output of the And gate 72 is connected to the servomotor 22 and controls the retracting sequence of the electrode 28.

An EDM off relay 74 has its input line 76 connected to the counter limit 60 and has its output 78 connected as an input to the And gate 72. In addition, the EDM off relay 74 is connected (not shown) to the EDM power source 32 to switch off the EDM power when the relay 74 has been activated by the counter limit 60.

In operation, assume the electrode 28 is in the position shown in FIG. 1 and is to be moved forward to machine the hole 36 in the workpiece 34. The EDM relay 52 is switched on to turn on the power source 32 and activate the EDM apparatus 18 so that the servomotor 22 begins moving the electrode 28 toward the workpiece 34. The EDM relay 52 generates a logic high output signal which is applied to sealed And gate 48 through the line 50. As the electrode 28 and the measuring device 14 simultaneously move toward the workpiece 34, hereinafter referred to as "forward", the sensing device 12 generates pulses of electrical energy representing increments of movement which are transmitted along line 40 to the amplifier 38 where the amplified pulses are applied to the And gate 44. However, these pulses are not conducted to the counter 56 since no signal is being applied to And gate 44 through its input line 46.

When the electrode 28 is moved into a spaced relation with the work 34 so that a proper gap distance is established therebetween, the first machining spark generated by the EDM power supply 32 will travel between electrode 28 and work 34. This causes a pulse signal to be transmitted to the sealed And gate 48 through line 54, and although the signal may be of short duration, the sealed And gate 48 will develop a logic high output and will remain activated until the signal is removed from line 50. Thus, when machining begins, the sealed And gate 48 transmits a logic high signal to the And gate 44 through line 46 so that the output of the And gate 44 is determined by the signals developed by the sensing device 12. Thus, the circuit 16 senses the position of the electrode 28 at the start of EDM machining.

The And gate 44 develops output signals in response to the amplified pulses transmitted through line 42 from the amplifier 38 and the counter 56 counts each pulse received. The counter 56 transmits pulse signals to the pair of counter limits 60 and 64 connected respectively by the lines 62 and 66. The counter limit 60 is pre-set so that it will develop a signal after a predetermined number of pulses have registered and the counter limit 64 is set so that it develops a logic high output whenever it registers zero pulses. Thus, as the counter 56 is counting pulses, the counter limit 60 is transmitting a low logic signal along the line 76 and the counter limit 64 is also developing a low logic signal which is inverted to a high logic signal by the inverter 68 that is transmitted through the line 70 to the And gate 72.

The machining movement of the electrode 28 is represented by the pulses which are registered in the counter 56. The pre-set limit 60 will develop an output through line 76 when a preselected number of these pulses have been counted indicating the preselected distance through which the electrode 28 will have travelled. This preselected distance, in the illustrated embodiment of the invention, is the distance required to move the electrode 28 through the work 34 to form the hole 36. When the limit of movement has been reached, the counter limit 60 transmits a signal to the relay 74.

The relay 74, in response to the output of the counter limit 60, is activated to switch off the EDM power source 32 and to transmit a logic high output signal to the And gate 72. Since a logic high signal is already being applied through line 70, the And gate 72 is activated to develop a logic high output signal which terminates operation of the servomotor 22 to move the electrode 28 forward and initiates operation of the servomotor 22 to retract or move the electrode 28 backward from the work 34.

As the measuring device 14 retracts simultaneously with the electrode 28, the sensing device 12 transmits pulses to the amplifier 38. The amplified pulses are applied to the And gate 44 which pulses the counter 56 to cause the counter 56 to count backward from the count which was reached when machining was terminated. When the counter 56 has counted backward to the count at which the zero limit 64 was pre-set, the limit 64 develops a logic high output signal that is inverted by the inverter 68 to a logic low signal which is transmitted to And gate 72 causing gate 72 to switch off. The resulting termination of signal from gate 72 causes servomotor 22 to shut off and terminate retraction of electrode 28.

The electronic refeed of this invention thus retracts the electrode 28 a known fixed distance determined by the counter 56 and the pre-settings on the limits 60 and 64. In the illustrated embodiment, the zero counter limit 64 is set to terminate retraction after the electrode 28 has been retracted a distance equal to or less than the distance of its forward movement.

The purpose of the zero counter limit 64 is to terminate a machining cycle with the electrode 28 in as close a position as is predictably possible to the ignition gap position that the electrode 28 must occupy to start the next machining cycle. In other words, the zero counter limit 64 is set to terminate retracting movement of the electrode 28 at a distance less than the distance that the electrode 28 was moved forwardly during machining, only to the extent that the amount of erosion of the electrode 28 during each cycle is predictable. This setting of the limit 64 at a number of counts less than the number of counts on the counter 56 when machining is terminated, is useful in reducing the amount of lost motion required of the electrode 28 during the start of the next machining cycle when it is necessary to first move the electrode 28 into an ignition gap position with respect to the work 34 before machining of the work 34 takes place.

A reset relay 80, connected to the zero counter limit 64 is actuated when the limit 64 reaches its pre-set and develops the logic high output signal referred to above. The relay 80 turns off the "EDM ON" relay 52 and the "EDM OFF" relay 74 and resets the counter 56 to zero so that the circuit 16 is conditioned for the start of the next machining cycle.

As can be seen, an electrode refeed 10 is provided which senses the position of electrode 28 at the start of machining, measures the forward movement of an electrode 28 after machining has begun and turns off the power source 32 after the electrode 28 has moved through the workpiece 34 a predetermined distance. The refeed then retracts the electrode 28 a pre-set distance which accommodates for electrode wear and positions the electrode 28 relative to the next workpiece 34 so that the next machining cycle can be commenced with a minimum of lost motion by the electrode 28.

What is claimed:

1. In electrical discharge machining apparatus having an electrode and means for moving the electrode toward and away from a workpiece for the purpose of machining the workpiece, an electronic sensing device operatively associated with said electrode moving means and operable to detect incremental movements of said electrode toward and away from said workpiece and to transmit electrical signals representing said incremental movements, and control circuit means connected to said electrode moving means and to said sensor means operable to terminate the supply of working current to said electrode after said electrode has travelled toward the workpiece a preselected distance, said control circuit means further operable to provide for the movement of said electrode away from said workpiece after said electrode has travelled toward the workpiece said preselected distance and terminate movement of said electrode away from said workpiece after it has travelled a predetermined distance less than said preselected distance.

2. Apparatus according to claim 1 wherein said electronic sensing device comprises a linear coding device operable to detect said incremental movements.

3. In electrical discharge machining apparatus having an electrode and means for moving the electrode toward and away from a workpiece for the purposes of machining the workpiece, an electronic sensing device operatively associated with said electrode moving means and operable to detect incremental movements of said electrode toward and away from said workpiece and to transmit electrical signals representing said incremental movements, and control circuit means connected to said electrode moving means and to said sensing device, said control circuit means including means for counting electrical signals received from said electronic device, means for detecting machining of a workpiece, and means for regulating movement of said electrode toward and away from the workpiece, wherein said counting means receives electrical signals from said electronic device after machining is detected by said machining detection means, said counting means being operable after receiving a predetermined number of electrical signals from said electronic sensing device representing forward movement of said electrode a preselected distance to terminate machining of the workpiece and to initiate movement of said electrode away from said workpiece, said regulating means terminating said movement of said electrode away from said workpiece after said electrode has travelled a predetermined distance less than said preselected distance.

* * * * *